Figure 1:
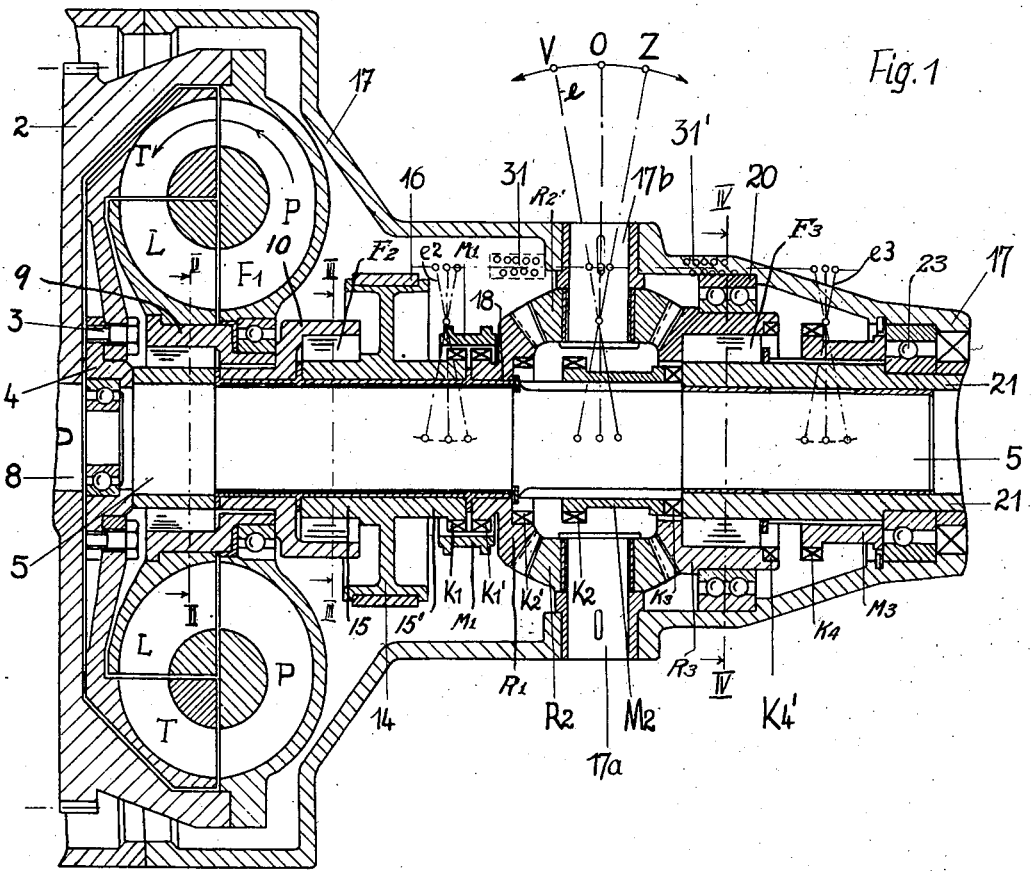

May 26, 1936. K. RABE 2,042,189

HYDRODYNAMIC GEAR

Filed Feb. 19, 1935 4 Sheets—Sheet 1

Inventor:
Karl Rabe
by Karl Viertel
Attorney.

May 26, 1936.   K. RABE   2,042,189
HYDRODYNAMIC GEAR
Filed Feb. 19, 1935   4 Sheets-Sheet 3

Inventor:
Karl Rabe
by Karl Viertel
Attorney

May 26, 1936.   K. RABE   2,042,189
HYDRODYNAMIC GEAR
Filed Feb. 19, 1935    4 Sheets-Sheet 4

Inventor:
Karl Rabe
by Karl Viertel
Attorney

Patented May 26, 1936

2,042,189

UNITED STATES PATENT OFFICE 2,042,189

HYDRODYNAMIC GEAR

Karl Rabe, Stuttgart, Germany

Application February 19, 1935, Serial No. 7,251
In Germany February 12, 1934

9 Claims. (Cl. 74—339)

My invention relates to hydrodynamic gears, having one single ring shaped fluid circuit, in which Föttinger's flow and reaction principle known from U. S. Patent 1,199,359 is carried into effect, and more particularly to improvements in that type of hydrodynamic gears known from U. S. Patent 1,970,236 to Kluge et al., which essentially consist of a primary or driving shaft, a secondary or driven shaft, a stationary casing and three bladed wheels, viz. a pump or impeller wheel, a turbine or impelled wheel of the centripetal type, and an auxiliary or guide wheel, and in which the guide wheel is so designed as to be capable of alternately performing the duty of a stationary guide rim—namely by taking up the difference between the torques of the driving shaft and the driven shaft—or acting as an auxiliary turbine by assisting in the work of the turbine proper.

As a matter of fact the maximum value of the ratio of gearing, up to which under conditions of economy—viz. satisfactory efficiency—the three bladed wheels converting the torque at the driving shaft into a larger torque at the driven shaft can be designed—known as their construction point—is limited in practice by unavoidable hydraulic losses through friction, impact and eddying of the working fluid within the bladed wheels, and hence the maximum torque obtainable at the driven (propeller) shaft is in many cases insufficient for instance for duly accelerating motor vehicles in congested traffic or in climbing long and steep inclines.

With the object of overcoming said drawback and obtaining a higher rate of torque conversion than obtainable hydrodynamically it has been already proposed to structurally combine hydrodynamic power transmission devices with mechanical reducing gears, generally known as speed changing mechanisms, in which the torque is converted by sets of toothed gear wheels.

As a rule composite hydrodynamic and mechanical gears of that character are of greater total weight and size and take up more space than available within the chassis of motor vehicles; besides they are more difficult to supervise and keep in proper working condition and— last not least—less economical as regards their resultant working efficiency.

The primary object of this invention is to overcome the said drawbacks by providing an improved hydrodynamic gear of the type described in U. S. Patent 1,970,236, particularly designed for use in motor vehicles, which will automatically adapt its manner of operation to the usual variations of the load, namely working under small loads as a torque non-converting coupling and automatically changing its function in response to an increase of the load to that of an ordinary torque converter, and—in addition thereto—the torque converting elements of which can be reset and associated by the driver of the vehicle in a new and more effective manner for producing still greater torques at the driven shaft, as required in starting and climbing, namely without employing reducing gears or the like.

More briefly stated the invention aims at providing a structurally improved gear of the hydrodynamic type concerned, which works and can be operated respectively in three different ways for propelling the motor vehicle in the forward direction at three different rates of speed.

In connection therewith the invention aims at so designing the hydrodynamic gear, that the entire structure will be within certain practical limitations as regards size and weight.

Another object of the invention is to provide novel means under the control of the operator at and within the stationary casing of the hydrodynamic gear, so that the latter can be conveniently used as a reversing gear.

Still other objects of the invention will incidentally become apparent hereinafter to those familiar with the intricacies of hydrodynamic gears.

Figure 2:
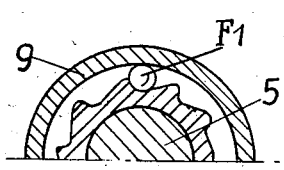
Figure 3:
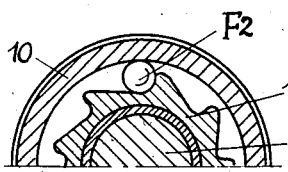
Figure 4:
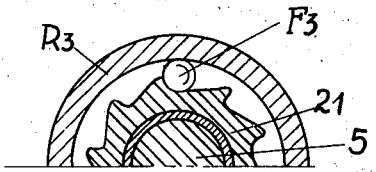
Figure 5:
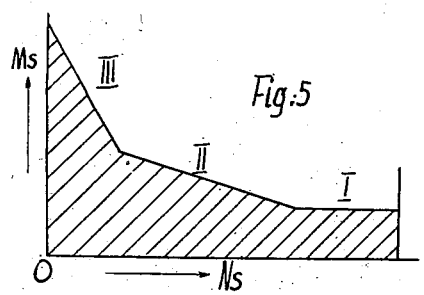

The nature and scope of this invention are briefly outlined in the appended claims and will be more fully understood from the following specification taken together with the accompanying drawings, in which Fig. 1 is a section, taken longitudinally through a hydrodynamic gear, designed according to this invention and being shown by way of an example, Figs. 2–4 are cross sections, taken on lines II—II, III—III, IV—IV in Fig. 1, Fig. 5 is a diagram, illustrating the three principal ways of function of the hydrodynamic gear shown in Fig. 1.

Figure 6:
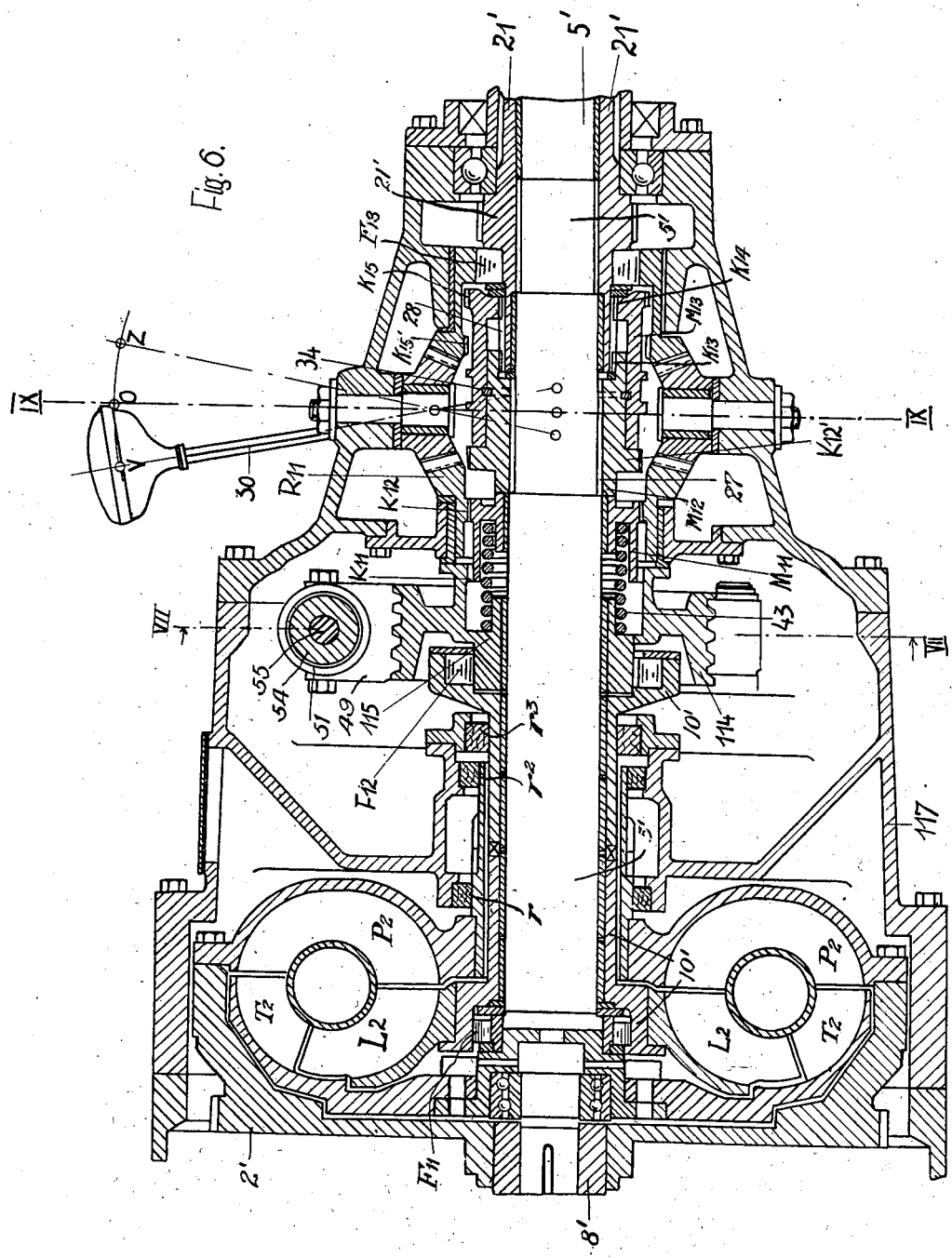
Figure 7:
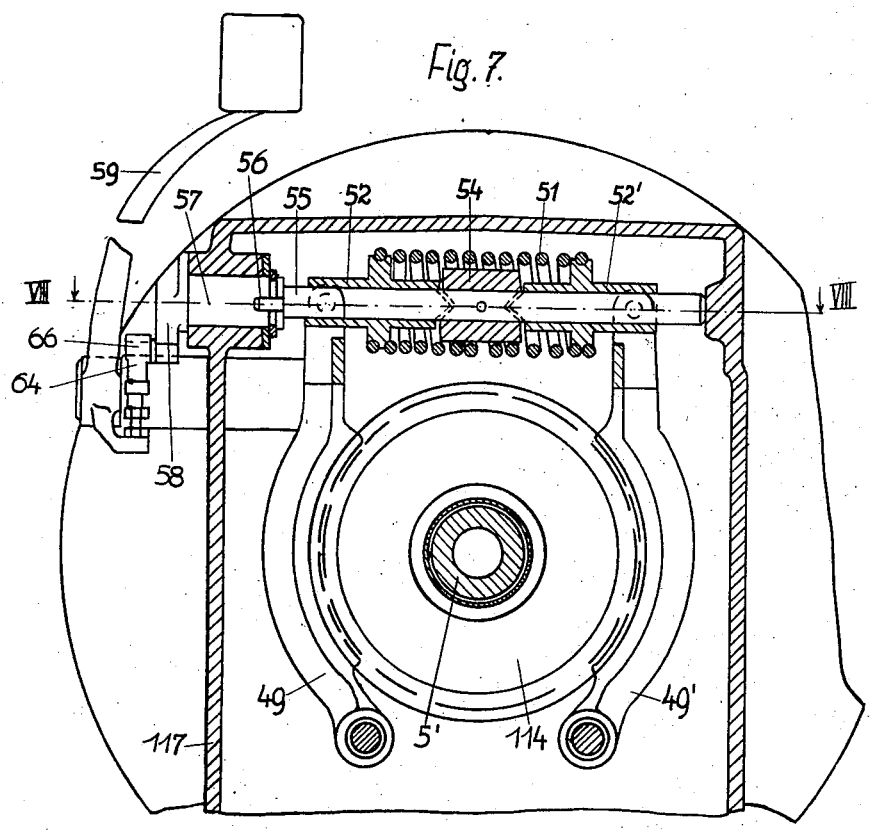
Figure 8:
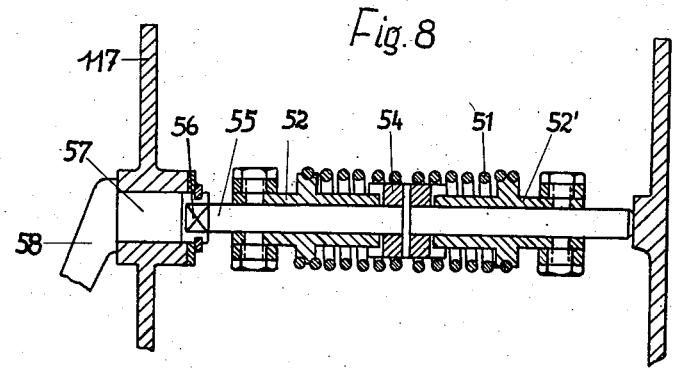
Figures 10, 11:
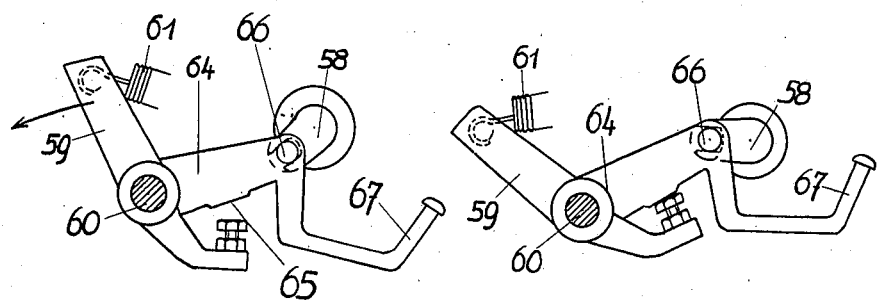
Figure 9:
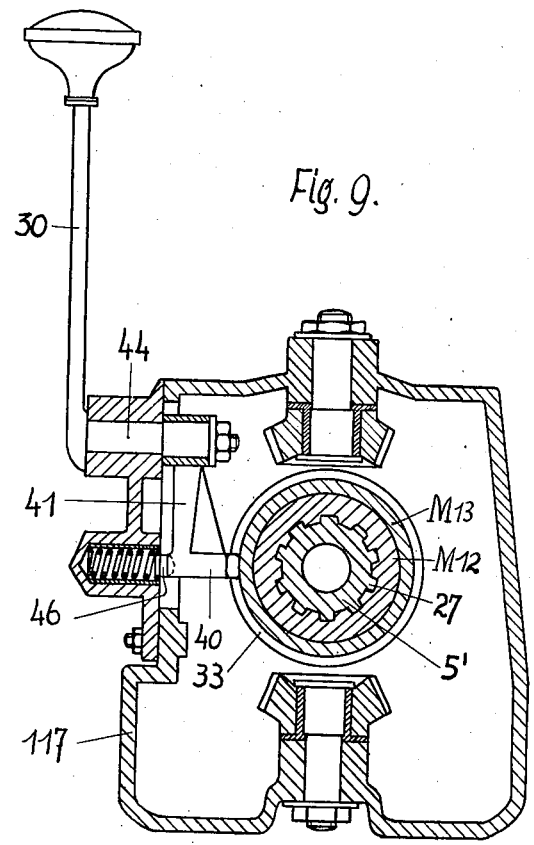

Whereas in Fig. 1 the shift levers and accessorial parts for throwing three clutches into and out of operation are only diagrammatically indicated for convenience sake, in Figs. 6–9 another specimen of a hydrodynamic gear designed according to this invention and having also three clutches is shown with all essential details including the actuating lever of said clutches;

Fig. 6 being a longitudinal section through a structurally modified hydrodynamic gear designed according to this invention, Fig. 7 is a cross section on line VII—VII in Fig. 6, Fig. 8 being a section on line VIII—VIII in Fig. 7, Fig. 9 a cross section on line IX—IX in Fig. 6, Figs. 10–11 are side elevations showing in two characteristic positions the foot operated means for actuating the brake.

With the objects in view outlined above the hydrodynamic gear or power transmission device structurally improved according to this invention essentially consists of three main sections, hereinafter called:

(I) fluid circuit section,
(II) brake section,
(III) reversing gear section.

In the embodiment of the invention shown by way of an example in Figs. 1–4 the fluid circuit section comprises:

A bladed pump wheel P keyed by means of a shell 2 to the primary or driving shaft 8, a bladed turbine wheel T of the radial inward flow or centripetal type, which is fixed by means of screw bolts 3 and a flange 4 to a rotary shaft 5, hereinafter called turbine or auxiliary shaft, a bladed guide wheel L, keyed to a rotary sleeve, which is conveniently made in two parts 9—10.

Said sleeve 9—10 is cooperatively associated with the auxiliary shaft 5 by means of a one-way self-locking clutch F1 of the roller and incline slot type (Fig. 2) in such manner, that, whenever the guide wheel L is apt to rotate in "forward" direction, namely the direction in which the primary and auxiliary (turbine) shaft rotate, and to incidentally overtake the auxiliary shaft 5, it will be automatically coupled with the latter.

The said self-locking clutch F1 may be appropriately termed at this juncture "forwardly acting" in contradistinction to another self-locking clutch F2 referred to hereinafter, which is of backwardly acting design, and to a third self-locking clutch F3 which is also a forwardly acting one.

The brake section of the hydrodynamic gear comprises:

A friction pulley 14 hereinafter briefly called brake arranged adjacent to said sleeve 9—10, coaxially thereto and having two elongated hub portions 15, 15'; a brake band 16 to be controlled by the operator by a hand lever or equivalent actuating means widely known in this and other arts and not shown; a stationary casing or support member 17, supporting said brake actuating means and enclosing the reversing gear section of the device, and a one-way self-locking clutch F2 of backwardly acting design, by which said friction pulley 14, sleeve 9, 10 and guide wheel L are cooperatively connected in such manner, that—whenever the guide wheel is apt to rotate in backward direction in response to an increase of the load on the secondary shaft viz. by taking up the difference of torques of the primary and secondary shaft and thus acting as a torque converting element—the guide wheel L is either arrested by said friction pulley 14, if the brake band 16 frictionally engages the latter, or the guide wheel L by yielding to the differential torque acting upon it, if said pulley 14 and brake band 16 are disengaged, will rotate in backward direction jointly with the sleeve 9, 10 and brake 14.

One of the most salient features of this invention is the provision of the aforesaid brake 14, namely of an auxiliary rotary member, to which the backwardly directed differential torque acting upon the guide wheel L under specific working conditions is transferred with the result, that the brake—when disengaged from the brake band—will rotate in backward direction relatively to the pump and turbine wheels P, T.

Another important step is the provision of means, by which the differential torque, active under specific working conditions upon the guide wheel L and in turn upon the brake 14—instead of being neutralized in the latter by the brake band 16 and in turn by the stationary casing 17, as with hydrodynamic gears known from U. S. Patent 1,970,236—is utilized at the operator's discretion for still enlarging the converted torque, obtained under the same working conditions at the turbine wheel T and is transferred from the latter to the secondary (driven) shaft 21. The latter is of tubular design and is releasably coupled with the turbine shaft 5 by means of a coupling member in the form of a splined sleeve M2 fitted on shaft 5 and having a crown of teeth K3 attached which engage another corresponding crown of teeth provided at the driven shaft 21.

In the embodiment of the invention shown in the drawings by way of an example the mechanism for utilizing the said differential torque imparted to brake 14 in the manner described comprises:

A reversing gear and means, cooperatively interconnecting the latter with the said brake pulley 14 and the secondary (driven) shaft 21 of tubular design in such manner, that the rotary backward motion of the brake 14 is reversed into a rotary forward motion, which in turn is transferred to the driven shaft 21.

Said reversing gear essentially consists of a primary bevel gear wheel R1, fitted with a bushing 18 and revolving around the central main axis of the device, a secondary wheel R3, carried by a ball bearing 20, which is fitted in the support 17, and revolving around the central main axis of the device, and a pair of intermediary wheels R2, R2', rotatably mounted on bolts 17a, 17b, which are keyed to the support 17, and meshing with the said primary and secondary wheels R1, R3.

Means are provided for coupling the brake 14 with the primary wheel R1 of the reversing gear and in turn with the driven shaft 21; said coupling means comprise in the embodiment of the invention shown by way of an example in Fig. 1:

A coupling member M1 in the form of a splined sleeve M1 interengaging crowns of teeth K1, K1', which are provided at the hubs of the pulley 14 and of the primary gear wheel R1, and a one-way self-locking clutch F3 of the forward acting type (Fig. 4), adapted to interlock the secondary gear wheel R3, when the latter revolves in forward direction, with the tubular driven shaft 21; said shaft is journalled in the casing 17 by means of a ball bearing 23 and supports the free end of turbine shaft 5.

A hydrodynamic gear having the novel structural features described above is adapted to work in three different phases or capacities, roughly indicated by the diagram lines I, II, III of Fig. 5, in which the abscissa Ns shows the growth of the rotary speed of the secondary shaft 21, while the ordinates Ms represent the total torques acting upon the secondary shaft under the assumption, that the prime mover runs at constant speed, producing a uniform torque.

*Working conditions pertaining to diagram line I*

With the driven shaft 21 running at high speed a relatively small torque is required, which can be met directly by the torque available at the primary shaft; brake pulley 14 is then arrested as shown in Fig. 1; likewise reversing gear R1—R2—R3 is at rest; the torque, produced at the turbine wheel T is transmitted through turbine shaft 5 and sleeve M2 to the driven shaft 21; guide wheel L is free to rotate in forward direction and to assist the work of the turbine by coupling itself at F1 with the turbine shaft 5. The device works simply as a hydrodynamic coupling, in which no torque conversion occurs.

*Working conditions pertaining to diagram line II*

A larger torque Ms is required at the driven shaft, 21, the rotary speed of which slows down accordingly; torque conversion is to follow; in this case brake band 16 continues to frictionally engage and arrest pulley 14 and in turn to check the wheels R1, R2, R3 of the reversing gear; guide wheel L, designed to take up the difference of torques of the primary and secondary shafts, is then apt to rotate in backward direction, but is locked at F2 with the result, that at the turbine wheel a larger torque is produced, which is transmitted to the driven shaft 21 through turbine shaft 5 and sleeve M2.

*Working conditions pertaining to diagram line III*

A still larger torque, as required for instance in starting a motor vehicle, in climbing etc. must be produced at the driven shaft 21; conversion of torque to a still higher degree than before indispensable; in this case the brake pulley 14 is set free to rotate by the operator, likewise the wheels R1, R2, R3 of the reversing gear, interengaged with the brake pulley 14, through sleeve M1 become free to rotate; the differential torque acting upon the guide wheel L will then backwardly revolve the latter and in turn brake pulley 14 and gear wheel R1 with the result, that gear wheel R3 rotating in forward direction will interlock itself at F3 with the driven shaft 21, thus adding the differential torque, active at the guide wheel L, to the torque, converted in the turbine wheel T and transmitted through turbine shaft 5 and sleeve M2 to the driven shaft 21.

Briefly stated: Under the conditions described and illustrated by diagram line III the hydrodynamic power transmission device works as a high duty torque converter, the kinetic energy flowing to the driven shaft 21 in two parallel currents, namely from turbine T through turbine shaft 5 and sleeve M2, and secondly from guide wheel L through pulley 14 and the reversing gear R1, R2, R3.

Another important feature of this invention is the provision of means under the control of the operator which are cooperatively associated with the reversing gear in such manner, that the direction of rotation of the driven shaft 21 can be reversed.

With this object in view a crown of teeth K2 is provided on the sleeve M2 for cooperation with teeth K2', formed on the gear wheel R1; a third coupling member in the form of a splined sleeve M3 fitted on the driving shaft 21 is provided having teeth K4 for cooperation with teeth K4' on the gear wheel R3; and all the three coupling members or sleeves M1, M2, M3 are slidably arranged in axial direction, being engaged by shift levers e, e2, e3, which are diagrammatically indicated in Fig. 1 in three characteristic positions V, O, Z and are resiliently interconnected by springs 31, 31', which are enclosed in shells, indicated by dash lines, and by connecting rods, indicated by dot and dash lines.

In Fig. 1 the sleeves M1, M2, M3 and their shift levers e, e2, e3 are shown in full lines and in their positions for forward drive, in which sleeve M3 is wholly disengaged; O indicates the neutral position of the shift levers, in which the whole device is out of commission, and Z is their position for backward drive; in the latter the teeth K, K' and K3—K3' are uncoupled, while the teeth K2—K2' and K4—K4' are in engagement; with the result, that the primary gear wheel R1 of the reversing gear, being directly coupled with the turbine shaft 5 through sleeve M2, will rotate in forward direction, while its mate, the secondary gear wheel R3, rotating backwardly and being coupled through sleeve M3 with the driven shaft 21 will revolve the latter in backward direction relatively to the turbine and primary shafts 5, 8.

Summarizing briefly the working characteristics of the hydrodynamic gear described with reference to Figs. 1–5: The shift levers e, e2, e3 require the operator's attention only for driving backwardly; in driving forwardly and as long as torques of small and medium values are required at the driven shaft the hydrodynamic gear changes its functions as a coupling and a torque converter automatically; only for starting, climbing and on like occasions, when larger torques are required, the brake band 16 must be temporarily disengaged: Excepting these relatively short working periods and those while driving backwardly the reversing gear is at rest.

Various changes and modifications may be conveniently made in the structural details of hydrodynamic gears of the design described above, without substantially departing from the spirit and the salient ideas of this invention, and without sacrificing any advantages obtained thereby.

The structurally modified hydrodynamic gear shown in Figs. 6–11 exhibits some additional features of importance, the fluid circuit section of same comprising: A pump wheel P2, to which the driving shaft 8' is keyed by means of a rotary shell 2'; a turbine wheel T2 keyed to an auxiliary or turbine shaft 5'; and a guide wheel L2, keyed to a sleeve shaped hollow shaft 10'; the latter is carried by the turbine shaft 5' so as to loosely rotate thereon; a one-way clutch F11 of forwardly acting design and structurally corresponding to the one-way clutch F1 shown in Figs. 1 and 2, which cooperatively associates the sleeve 10' and the turbine shaft 5' in such manner, that whenever the guide wheel L2 tends to rotate in forward direction and to overtake the turbine wheel T2, guide wheel L2 will be automatically coupled with the turbine shaft 5' through sleeve 10' and one-way clutch F11; reversely whenever the guide wheel L2 under specific working conditions of the device acts as a torque converting element and—because of taking up then the differential torque of the driving and driven shafts 5'—21'—tends to rotate in a direction reversely to that of the driving shaft 8', it will be automatically coupled through sleeve 10' and another one-way clutch F12 of rearwardly acting design, which corresponds structurally to clutch F2 shown in Figs. 1 and 3, with the hub 115 of brake pulley 114; the cross hatched members r, r2, r3 at the left of clutch F12 are packing rings.

The brake pulley 114 is cooperatively associated with a pair of brake shoes 49, 49' (Fig. 7) fulcrumed at the support member 117 and being arranged in symmetric position to said pulley, so as to engage the latter at opposite sides, and actuating means are provided for throwing said brake shoes into and out of operation; said actuating means comprise:

A spring 51 resiliently interconnecting the endpieces 52, 52' of said brake shoes, so as to draw the latter into engagement with said pulley 114, a rotary cam 54 for disengaging said brake shoes and positively keeping them in their idle position, and means for turning said cam into its operative and inoperative positions.

Said cam turning means comprise a crank shaft made in two pieces 55—56, 57—58 to which said rotary cam 54 is bolted, and a foot operated lever 64 (Figs. 10–11) having a pedal 67 attached and being linked at 66 to crank 58 by a pin and slot connection.

I prefer to cooperatively associate the said brake lever 64, which is fulcrumed at 60 with a spring loaded pedal 59—61 for controlling the fuel supply to a prime mover (internal combustion engine), with which the primary shaft is connected, in such manner that, whenever the said pedal 59 is moved into and beyond the position of maximum fuel supply, it will engage at 65 and turn the brake lever 64 so as to throw the brake shoes 49, 49' into their idle position.

The sleeve shifting mechanism of modified design, shown in Figs. 6 and 9, comprises:

A sleeve M11, loosely fitted on turbine shaft 5', so as to be slidable and rotatable thereon, and having two spaced sets of teeth for cooperation with corresponding sets of teeth K11, K12 provided respectively at the multi-cone pulley 114 and the primary wheel R11 of the reversing gear; a second sleeve M12, which is slidably mounted on the turbine shaft 5', splined at 27, and has one set of teeth K12' for cooperation with said teeth K12 of the primary wheel R11 of the reversing gear, and another set of teeth K13 for cooperation with a splined section 28 of the secondary shaft 21'; a third sleeve M13, which is slidably arranged in axial direction and is provided with two sets of teeth K14, K15 for cooperation respectively with the said splined section 28 of the driven shaft 21' and with teeth K15' at the secondary wheel R13 of the reversing gear; sleeve M13 is rotatably fitted on sleeve M12 and permanently retained thereon by a retaining ring 34, so as to form therewith a compound sleeve, capable of being shifted as one unit by a single shift lever 30.

A compression spring 43 enclosed in the sleeve M11 and bearing against the latter and the hub of pulley 114 keeps said sleeve resiliently in engagement with its mate, the compound sleeve M12—M13; all the three sleeves because of their cooperative interengagement through said spring 43 and retaining ring 34 are jointly moved into their respective positions V, O, Z by one and the same shift lever 30.

As seen in Fig. 9 shift lever 30, fulcrumed at 44 in the support member 17', engages by means of a crank 41 and pin 40 a groove 33 circumferentially provided on sleeve M13; the crank 41 is adapted to be locked in a manner widely known in three different positions V, O, Z (forward—neutral—backward) referred to above, namely by a spring loaded bolt 46 engaging corresponding recesses in the crank 41. Reviewing and summarizing briefly the manner of operation of the hydrodynamic gear shown in Fig. 6:

On driving the vehicle in forward direction—namely while the shift lever 30 is in the position at V and the brake pulley 114 arrested—the rotary energy of the prime mover, delivered through shaft 8' and shell 2' to pump wheel P2 is transferred therefrom through turbine wheel T2 to the turbine shaft 5' and from the splined section 27 of the latter through sleeve M12 at K13 to the secondary shaft 21'.

Under loads of medium values at the secondary shaft, and as long as the guide wheel L2 is arrested the hydrodynamic gear shown in Fig. 6 acts as a torque converter but automatically changes its function—like that shown in Fig. 1—so as to work as a coupling, whenever the load drops below a certain limit.

In this case the guide wheel L2 will rotate in forward direction and automatically couple itself by means of sleeve 10' and a one-way clutch F11 of the type shown in Fig. 2, designed for "forward" drive with the turbine shaft 5'.

On starting the vehicle, climbing and other occasions, when there is a high load on the secondary shaft, the brake pulley 114—115 must be disengaged by the driver and is then free to rotate with the result, that guide wheel L2 on starting to rotate in backward direction will couple itself automatically through the sleeve 10', one-way clutch F12, brake pulley, 114, 115 and sleeve M11 with the primary wheel R11 of the reversing gear and in turn through the one-way clutch F13 acting in forward direction with the secondary shaft 21'.

For driving the vehicle in backward direction the shift lever 30 must be turned into the position indicated at Z, whereby the teeth K12—K12' and K15—K15' are brought into engagement, while teeth K11, K13 and their mates are out of commission.

Under these conditions the rotary energy of the turbine shaft 5' is transmitted to the secondary shaft 21' exclusively through the reversing gear, of which the primary wheel R11 is coupled with the turbine shaft 5' through sleeve M12 splined on the latter, while the secondary wheel is coupled with the secondary shaft 21' through sleeve M13 splined thereon. It will be noted, that on driving in backward direction the one-way clutches F11 and F13, which are designed for "forward" direction and correspond in their function to those shown in Figs. 2 and 4, are out of commission.

What I claim is:—

1. A hydrodynamic power transmitting device of the Föttinger type comprising a support, a set of bladed wheels enclosing a single fluid circuit and including a pump, a turbine and a guide wheel,—a plurality of rotary shafts, including a driving shaft keyed to said pump wheel, a driven shaft journalled in said support, an auxiliary shaft keyed to said turbine wheel and arranged intermediate the driving and the driven shafts, and a sleeve-shaped shaft keyed to said guide wheel,—a rotary brake mounted on said auxiliary shaft, actuating means carried by said support for arresting and setting free said brake, two self-locking clutches, viz. a forwardly acting one coaxially associating said sleeve and auxiliary shaft for engaging and disengaging the latter in response to changes in the direction of rotation of the guide wheel, and a rearwardly acting one coaxially associating said sleeve and brake for arresting the guide wheel or allowing the latter to rotate in response to changes in the operation of said brake, and a reversing gear cooperatively associated with the said brake for transmitting rotary energy from the latter to the driven shaft, said reversing gear comprising a primary and a secondary gear wheel, which are arranged coaxially to said rotary brake, intermediary gear wheels mounted in said support, and a self-locking clutch cooperatively associating the secondary wheel of said reversing gear and the driven shaft so as to interlock and unlock the latter in response to changes in the direction of rotation of the reversing gear relatively to that of the driven shaft.

2. A hydrodynamic power transmitting device of the type set forth and having the features outlined in claim 1, in which a plurality of coupling members are coaxially arranged to the said rotary brake, the auxiliary and the driven shafts for reciprocally coupling and uncoupling the brake and the primary wheel of the reversing gear, said primary wheel and the auxiliary shaft, the latter and the driven shaft, the latter and the secondary wheel of the reversing gear,— and means under the operator's control and being carried by said support for actuating said coupling members.

3. A hydrodynamic power transmitting device of the type set forth and having the features outlined in claim 1, in which a plurality of coupling members are coaxially arranged to the said rotary brake, the auxiliary and the driven shafts for reciprocally coupling and uncoupling the brake and the primary wheel of the reversing gear, said primary wheel and the auxiliary shaft, the latter and the driven shaft, the latter and the secondary wheel of the reversing gear,—and means under the operator's control and being carried by said support for actuating said coupling members,—said coupling members being of the positive engagement type and comprising three splined sleeves, slidably arranged in axial direction, the first one for cooperation with crowns of teeth provided on the brake member and the primary wheel of the reversing gear, the second one being splined on the auxiliary shaft for cooperation with another crown of teeth, provided on the primary wheel of the reversing gear, and with a crown of teeth, provided at the secondary wheel of the reversing gear, the third sleeve being splined on the driven shaft for cooperation with another crown of teeth, provided on said secondary wheel of the reversing gear.

4. A hydrodynamic power transmitting device of the type set forth and having the features outlined in claim 1, in which a plurality of coupling members are coaxially arranged to the said rotary brake, the auxiliary and the driven shafts for reciprocally coupling and uncoupling the brake and the primary wheel of the reversing gear, said primary wheel and the auxiliary shaft, the latter and the driven shaft, the latter and the secondary wheel of the reversing gear,—and means under the operator's control and being carried by said support for actuating said coupling members,— said coupling members being of the positive engagement type and comprising three splined sleeves, slidably arranged in axial direction, the first one for cooperation with crowns of teeth provided on the brake member and the primary wheel of the reversing gear, the second one being splined on the auxiliary shaft for cooperation with another crown of teeth, provided on the primary wheel of the reversing gear, and with a crown of teeth, provided at the secondary wheel of the reversing gear,— said coupling actuating means comprising a hand operated lever, fulcrumed in the support member and engaging one of said splined sleeves, resilient connecting elements and auxiliary levers being provided for interconnecting the other two splined sleeves with the said hand operated lever.

5. A hydrodynamic power transmitting device of the type set forth and having the features outlined in claim 1, in which a plurality of coupling members are coaxially arranged to the said rotary brake, the auxiliary and the driven shafts for reciprocally coupling and uncoupling the brake and the primary wheel of the reversing gear, said primary wheel and the auxiliary shaft, the latter and the driven shaft, the latter and the secondary wheel of the reversing gear,—and means under the operator's control and being carried by said support for actuating said coupling members,—said coupling members being of the positive engagement type and comprising three splined sleeves, slidably arranged in axial direction, the first one for cooperation with crowns of teeth provided on the brake member and the primary wheel of the reversing gear, the second one being splined on the auxiliary shaft for cooperation with another crown of teeth, provided on the primary wheel of the reversing gear, and with a crown of teeth, provided at the secondary wheel of the reversing gear, the third sleeve being splined on the driven shaft for cooperation with another crown of teeth provided on said secondary wheel of the reversing gear,— said second and third sleeves being keyed to each other by a retaining ring so as to form one unit or compound sleeve, the latter being arranged adjacent to said first sleeve, a spring being provided for resiliently keeping said first sleeve in engagement with the said compound sleeve.

6. A hydrodynamic power transmitting device of the type set forth and having the features outlined in claim 1, in which a plurality of coupling members are coaxially arranged to the said rotary brake, the auxiliary and the driven shafts for reciprocally coupling and uncoupling the brake and the primary wheel of the reversing gear, said primary wheel and the auxiliary shaft, the latter and the driven shaft, the latter and the secondary wheel of the reversing gear,—and means under the operator's control and being carried by said support for actuating said coupling members,—said coupling members being of the positive engagement type and comprising three splined sleeves, slidably arranged in axial direction, the first one for cooperation with crowns of teeth provided on the brake member and the primary wheel of the reversing gear, the second one being splined on the auxiliary shaft for cooperation with another crown of teeth, provided on the primary wheel of the reversing gear, and with a crown of teeth, provided at the secondary wheel of the reversing gear, the third sleeve being splined on the driven shaft for cooperation with another crown of teeth, provided on said secondary wheel of the reversing gear,— said second and third sleeves being keyed to each other by a retaining ring so as to form one unit or compound sleeve, the latter being arranged adjacent to said first sleeve, a spring being provided for resiliently keeping said first sleeve in engagement with the said compound sleeve,— said clutch actuating means comprising a hand operated lever fulcrumed in the support member, and engaging said compound sleeve.

7. Hydrodynamic power transmitting device of the type set forth and having the features outlined in claim 1, in which said rotary brake member and braking means comprise a friction pulley and a pair of brake shoes fulcrumed at the support member and being arranged in symmetric position to said pulley, so as to circumferentially engage the latter at opposite sides and actuating means for throwing said brake shoes into and out of operation,—said actuating means comprising a spring resiliently interconnecting the free ends of said brake shoes, so as to draw the latter into engagement with said pulley, a rotary cam for disengaging said brake shoes and positively keeping them in their idle position, and means for turning said cam into its operative and inoperative position.

8. Hydrodynamic power transmitting device of the type set forth and having the features outlined in claim 1, in which said rotary brake member and braking means comprise a friction pulley and a pair of brake shoes fulcrumed at the support member and being arranged in symmetric position to said pulley, so as to circumferentially engage the latter at opposite sides, and actuating means for throwing said brake shoes into and out of operation,—said actuating means comprising a spring resiliently interconnecting the free ends of said brake shoes, so as to draw the latter into engagement with said pulley, a rotary cam for disengaging said brake shoes and positively keeping them in their idle position, and means for turning said cam into its operative and inoperative positions,—said turning means comprising a crank shaft, to which said rotary cam is keyed, and a foot operated lever having a pedal attached and being linked to the crank concerned by a pin and slot connection.

9. Hydrodynamic power transmitting device of the type set forth and having the features outlined in claim 1, in which said rotary brake member and braking means comprise a friction pulley and a pair of brake shoes fulcrumed at the support member and being arranged in symmetric position to said pulley, so as to circumferentially engage the latter at opposite sides, and actuating means for throwing said brake shoes into and out of operation,—said actuating means comprising a spring resiliently interconnecting the free ends of said brake shoes, so as to draw the latter into engagement with said pulley, a rotary cam for disengaging said brake shoes and positively keeping them in their idle position, and means for turning said cam into its operative and inoperative positions,—said turning means comprising a crank shaft, to which said rotary cam is keyed, and a foot operated lever having a pedal attached and being linked to the crank concerned by a pin and slot connection,—said lever being cooperatively associated with a pedal for controlling the fuel supply to an internal combustion engine, with which the driving shaft is connected, in such manner, that whenever the said pedal is moved into and beyond the position of maximum fuel supply, it will engage and turn the brake lever so as to throw the brake shoes into their idle position.

KARL RABE.